United States Patent [19]

Bilczo et al.

[11] 4,071,885
[45] Jan. 31, 1978

[54] ELECTRIC ARC WELDING POWER SUPPLY

[75] Inventors: Dale Louis Bilczo, Parma Heights; Kenneth Anthony Golonka, Richmond Heights; John Arthur Overman, Chagrin Falls; John Ernest Carroll, Moreland Hills, all of Ohio

[73] Assignee: The Lincoln Electric Company, Cleveland, Ohio

[21] Appl. No.: 638,165

[22] Filed: Dec. 5, 1975

[51] Int. Cl.² .......................................... H02M 7/00
[52] U.S. Cl. ..................................... 363/64; 219/130; 363/87; 219/33
[58] Field of Search ................... 219/131 R, 131 WR; 307/252 F, 252 N; 315/141, 142; 317/33 SC; 321/11, 12, 18, 47, 26; 335/184; 363/52–54, 64, 85, 87

[56] References Cited

U.S. PATENT DOCUMENTS

| 1,760,533 | 5/1930 | Whitaker | 321/26 |
|---|---|---|---|
| 1,979,699 | 11/1934 | Maslin | 321/26 X |
| 2,044,593 | 6/1936 | Sabbah | 321/26 |
| 2,825,022 | 2/1958 | Boyer et al. | 321/26 |
| 3,337,769 | 8/1967 | Buchanan | 315/142 |
| 3,416,061 | 12/1968 | Rosenberry, Jr. | 321/47 X |
| 3,571,659 | 3/1971 | Anzai et al. | 317/33 SC X |
| 3,614,377 | 10/1971 | Stearns et al. | 219/131 R |
| 3,665,149 | 5/1972 | Sakabe et al. | 219/131 R |
| 3,777,113 | 12/1973 | Arikawa et al. | 219/131 R X |
| 3,862,439 | 1/1975 | Coccio | 307/252 F X |

FOREIGN PATENT DOCUMENTS

| 1,100,792 | 9/1959 | Germany | 321/26 |
|---|---|---|---|
| 359,726 | 6/1938 | Italy | 321/26 |
| 738,300 | 10/1955 | United Kingdom | 321/26 |

Primary Examiner—William M. Shoop
Attorney, Agent, or Firm—Meyer, Tilberry & Body

[57] ABSTRACT

A three phase electric arc welding power supply using SCR rectifiers for output control which has improved output characteristics, fault protection and current and voltage controls. The main power transformer includes two secondaries connected in a double wye with the neutral points supplying power to one of the output terminals a pair of independent inductances are in series, one with each set of secondaries. Increased phaseback of the SCR's may be effected without the use of additional inductance in the output circuit. The fault protection circuit has a time-current trip curve closely approximating the time-current overload curve of the SCR's whereby the minimum size SCR's for a given maximum current output is obtained. The control circuit is fast responding and gives either: constant voltage output; or variable voltage, constant current output with both line voltage compensation and with increase of current when the arc is shorted and the arc voltage drops below a predetermined amount. Improved firing circuits for the main and pilot SCR's are provided.

35 Claims, 15 Drawing Figures

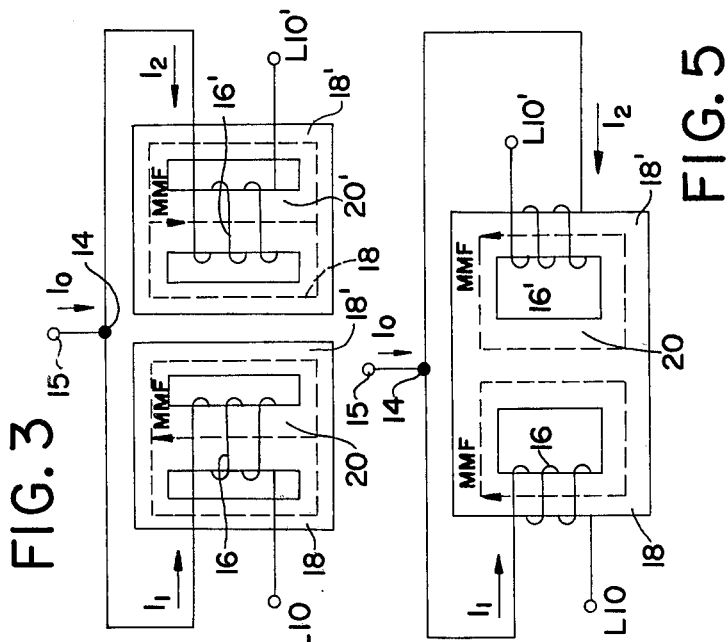
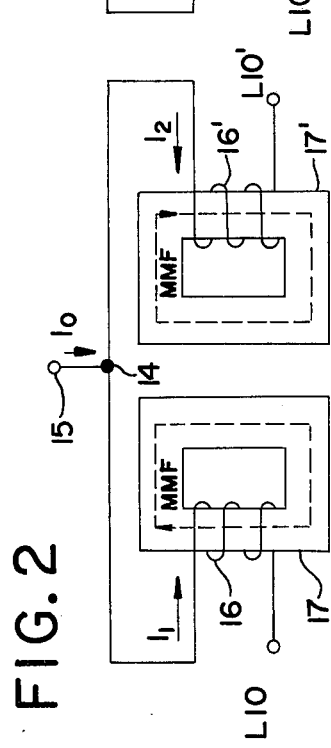
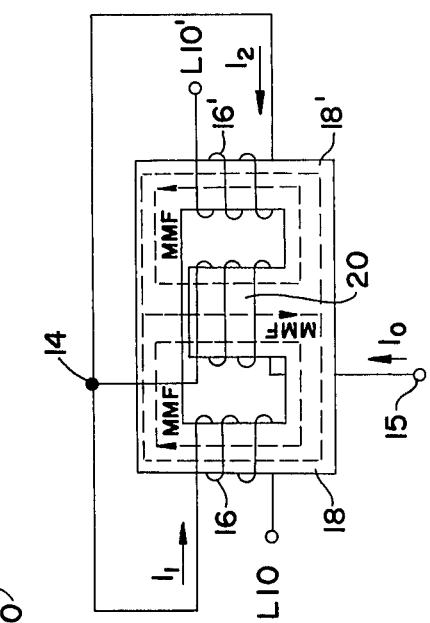

ELECTRIC ARC WELDING POWER SUPPLY

This invention pertains to the art of electric arc welding power sources and more particularly to a three phase transformer-rectifier type power supply using SCR's for controlling the output of the power source.

Transformer-rectifier type arc welding power sources always contain a ripple which can adversely affect the quality of the weld bead laid down by the welding electrode. It has been conventional to place an inductance or choke in series with the output of such power sources to remove or limit the amount of ripple. However, if the ripple is excessive, then the amount of inductance to smooth it out becomes excessive and adversely affects the welding characteristics particularly on starting or when the power source is used in welding where a droplet on the end of the electrode periodically shorts out to the weld pool.

To limit the amount of inductance required it has been conventional and preferred to use three phase electric power whereby the ripple frequency is increased and its amplitude is decreased whereby the amount of inductance required to filter out or smooth this ripple is correspondingly decreased. Further it has been proposed to use a transformer having six secondary windings connected in a six phase star such that the ripple frequency will be on the order of 360 Hz. Such a star connected secondary is economically expensive due to the high cost of the large capacity SCR's and of the sophisticated thermal protection circuitry which is required since each SCR conducts for a maximum of only 60 electrical degrees, and at any instant in time the total welding current is carried by only one SCR.

In any SCR output controlled power source, as the SCR's are phased back to lower the output, the amount of ripple increases. In conventional three phase and six phase star sources, the ripple is smoothed by a choke in the output. A point is reached where notching of the output curve results, i.e. where the ripple becomes so excessive, that satisfactory welding cannot be obtained. Thus when using six phase star system for welding applications, the large amount of inductance required in the smoothing choke to smooth the notches in the output at 120° phase back of the SCR's makes the welding unsatisfactory.

It has also been proposed to connect the six secondaries as a double wye with the inner terminals of a system of three windings being interconnected to form a neutral point and the neutral points being interconnected by means of an interphase transformer, a midtap on which provides the negative output of the power source. Such an arrangement is shown in the patent to Aldenhoff et al. U.S. Pat. No. 3,371,242.

The double wye with an interphase transformer system differs from the star arrangement in that each SCR in the double wye conducts for a maximum of 120 electrical degrees and during this conduction period each SCR conducts only one half of the total welding current. In a sense the interphase transformer of the double wye system provides proper current division between the two wye systems so that the two secondary systems operate in parallel.

The interphase transformer consists of two coils wound on a common laminated core. The mmf's of the two coils are opposing, and therefore, to maintain equal mmf's the resulting magnetic coupling balances the voltages in each of the two circuits between the interphase coil and the wye secondaries to produce the parallel flow of wye currents so that the two wye currents are equal in magnitude and in phase with each other and have a ripple frequency of 360 Hz. This coupling action enables parallel operation of the SCR's with phaseback angles up to approximately 113° beyond which its effectiveness diminishes and operation is similar to that in a six phase star.

The inductance of the interphase transformer is due entirely to leakage inductance, and the magnitude of this inductance is not sufficient to satisfy the arc. Consequently a smoothing choke as shown in Aldenhoff is required in the D.C. output circuit to generate the necessary inductance for welding. Similar to the six phase star, the double wye with interphase transformer requires such a large amount of inductance in the smoothing choke to smooth the notches in the output at 120° phaseback of the SCR's that welding at this lowered output becomes unsatisfactory.

Thus it is to be noted that as the SCR's are phased back to lower the output, more and more inductance is required in the smoothing choke to eliminate the notches in the output. However, this phaseback situation is usually present when the output voltage is lowered to obtain a drop type transfer between the electrode end and the weld pool and the inductance necessary to effect the smoothing of the ripple in the output caused by the phaseback then makes this type of short circuit welding impossible.

The three phase double wye however is advantageous over the six phase star in that for a given size SCR the double wye with interphase transformer is capable of handling twice the welding current as the six phase star.

The present invention provides a double wye secondary arrangement with SCR rectifiers which overcomes all of the above referred to difficulties and others and provides the necessary inductance in the welding circuit without a separate smoothing choke and enables a greater phaseback of the SCR's before the adverse effects of notching appear.

In accordance with the present invention the power transformer has two secondaries each made up of three windings connected as a double wye with the neutral points of the two wyes supplying power to one of the terminals of the power source and a pair of independent inductors one in electrical series with each secondary and a terminal of the power source. The difference between the present invention and the prior art is that in the invention, the flux of one coil of one inductor has little or no interaction with the flux of the coil of the other inductor whereas in an interphase transformer, the flux of each coil of the transformer is closely linked with the other coil. Thus the manner in which the interphase voltages are treated overcomes the welding problems described for both the six phase star power source and the double wye with interphase transformer. The invention is similar to the double wye with an interphase transformer in that both systems have parallel operation of the two wye secondary circuits. However, the means by which the invention generates the interphase voltages to permit this parallel operation minimizes the notching in the welder output at the larger phaseback angles. The invention also generates sufficient inductance in the welding circuit to satisfy the arc conditions since the design of the independent inductance allows the magnitude of the inductance to be preselected thereby eliminating the need of a smoothing choke. The parallel operation of the two wye currents in the invention results in the same SCR ratings as the double wye with interphase transformer so that the invention can also utilize the economic advantage of the smaller SCR's.

In accordance with the invention, the independent windings may be wound on separate iron configurations, either core-type or shell-type, or on the outer legs of shell-type laminations having a center leg twice the area of the side legs in which latter case the mmf's in the center leg may either be opposing or additive. However if the mmf's are additive, then a third winding can be placed on the center leg in series with the midpoint and the output of the power source so that the D.C. current flowing therein provides additional ampere-turns to the magnetic circuit resulting in increasing the total inductance of the interphase inductances. In this latter instance, the center leg must have an air gap. By controlling the level of excitation of this coil either by means of a shunt or by varying the number of turns in the coil, a variable inductance can be designed for various welding arc requirements.

It is to be noted that the windings of an interphase transformer will have some inductance due to the leakage reactance of the transformer. The present invention in all instances contemplates independent inductances in series with each secondary in excess of that which would be provided by the normal leakage reactance in an interphase transformer.

The differences in operation are rather subtle. Both a conventional interphase transformer or an independent inductance can be used for parallel operation of two wye connected secondaries that are 180° phase shifted from each other. In each case, the vector sum of the conducting wye voltage of one transformer plus its associated induced interphase voltage must equal the conducting wye voltage of the other transformer plus its associated induced interphase voltage. The major difference between the two systems is that in the conventional interphase transformer, the interphase voltage is the result of mutual inductance between the two interphase coils, while the voltage of the independent inductances is the result of self-inductance. This difference provides the novel results of the present invention. Oscilloscope studies of the currents in each wye with the interphase transformer at a 90° phaseback of the SCR's show that the currents are equal and generally in phase with each other. The ripple frequency is 360 Hz. With the independent inductances, the currents in the two are equal but shifted 60° in phase. The ripple frequency of each is 180° Hz.

A further difference is that with the interphase transformer at 113° phaseback, the SCR's start to conduct for less than 120°, and the notching first appears and the current goes to zero. With the present invention, using independent inductances, the notch does not begin to appear until 160° phaseback and the current does not go to zero.

Another problem with the use of SCR's for varying the output of an arc welding power source has been that of deenergizing the power source in the event of an overload on the SCR's of a time period which will exceed the overload ratings of the SCR's and destroy them. It is thus known that SCR's will loose gate control when the junction temperature exceeds 125° C leading to possible failure. The higher the current the higher the junction temperature. All SCR's have known or published formulas for predicting the junction temperature versus load or overload and time.

Overload currents can have an infinite variety of time-current characteristics. The shortest time-current overloads exist during normal welding when the electrode momentarily touches the work or a molten drop on the end of the electrode transfers across the arc and touches the weld pool while still on the end of the electrode. Longer time-current overloads occur under starting conditions when the electrode touches the work just before the arc is initiated. The longest time-current overload occurs when the electrode is accidentally shorted to the work. In actual practice many shorts occur of varying magnitude and duration.

Conventional circuit breakers, fuses and electronic circuit breakers are either not fast enough for severe shorting conditions or too fast for arc starting conditions causing nuisance trips of the circuit breaker. Therefore in the past the main power SCR's had to be oversized for the maximum rating of the machine in order to prevent failure thereof.

The present invention contemplates an SCR protection circuit which generates a continuously variable tripping time as a function of the SCR overload current. In other words, the time to trip the SCR's off the line is a constantly varying function with changes in overload current. The higher the current the shorter the time to trip. The circuit can be programmed to closely match the maximum junction temperature rating of the SCR's.

In accordance with the invention, switch means are provided which when 'on' de-energize the power source, the switch means having a first input terminal which determines the voltage level to which a second input terminal must be charged to make the switch means go 'on,' in combination with amplifiers for a voltage proportional to the load current and a plurality of switches, the first of which is programmed to turn the switch means 'on' after a predetermined time period after the load current just exceeds the maximum steady state overload current ratings of the SCR's and the others of which are programmed to progressively go 'on' as the overload current progressively increases beyond the steady state overload current and decrease the time period to change the second input to the required level and further in combination with means for lowering the required voltage level as the amount of overload current increases. Further some of the later acting switches are programmed to change the voltage level at which the switch means goes 'on.'

The fault circuit uses an opamp to amplify a load current proportional voltage which opamp has both a resistive and capacitive feedback circuit in parallel whereby dynamic changes in the voltage are filtered out and do not prematurely trigger the switches.

A further problem with transformer SCR rectifier type variable output welding sources has been to be assured that the SCR's will always be fired at exactly the precise phaseback angle desired. Heretofore pilot SCR's have been employed for this purpose with the pilot SCR being fired by a programmable unijunction transistor, the time of firing of which is determined by a charge on a capacitor, which transistor energized the gate of the pilot SCR through a pulse transformer. It was found that the current to the gate of the pilot SCR in the secondary of the pulse transformer created a bias on the transistor which would prevent complete discharge of the timing capacitor associated with the unijunction transistor in varying amounts which would affect the time of firing.

In accordance with the present invention, a capacitor is placed in series between the secondary of the pulse transformer and the gate of the pilot SCR. With such an arrangement the currents to the gate of the SCR do not flow in the secondary of the pulse transformer and no reverse voltages can be generated in the primary of the pulse transformer to bias the transistor and prevent complete discharge of the timing capacitor associated therewith.

In transformer SCR type welding power supplies of the type heretofore employed, there has always been enough inductance in the output filter choke to delay the momentary current surges on the SCR's caused by momentary short circuits either on starting or while welding, for example in dip transfer or short circuit type welding. With the present independent interphase inductances, there is no inductance in the output circuit to delay these surges and the inductance or leakage reactance in the transformer is held as low as possible. Accordingly, in accordance with the invention, the control circuit for phasing back the SCR's is made very stiff, that is with a very rapid response time such that in the event of a momentary short circuit, the SCR's will be quickly phased back before the fault protection circuit must take over. On the other hand, the control circuit must not react to extremely rapid or dynamic voltage changes.

The control circuit for controlling the firing circuit for the SCR's has as one of its input or feedback signals, an unfiltered voltage proportional to the source output voltage, in combination with dynamic filtering of rapid time varying voltages in the control circuit amplifiers whereby the SCR's can be phased back in time periods less than 10 cycles of a 60 Hz. A.C. power source i.e. in under 0.17 seconds. In the absence of such rapid time response, hunting and instability of the arc occurs.

This dynamic filtering is obtained by using opamps for the amplifiers in the control circuit and using frequency sensitive feedback circuitry on the opamp for lowering the gain of such opamps to rapid changes in source output voltage or current due to short circuits.

The principal object of the present invention is the provision of a new and improved multi-phase transformer rectifier type arc welding power source using SCR's for controlling the output of the power source which for a given output rating is more economical to manufacture, permits a wider control of the output without the adverse effects of notching in the output, has improved fault protection circuitry and improved control of the firing of the SCR's.

Another object of the invention is the provision of a power source of the type described including a transformer having six secondary windings connected as a double wye with the neutral point of the wyes being interconnected by a pair of independent interphase inductances whereby increased amounts of SCR phaseback may be used without deleterious effects on the output of the welder.

A further object of the invention is the provision of a new and improved power source of the type described wherein the independent interphase inductances provide all of the inductance necessary for the power source to provide good welding conditions.

Another object of the invention is the provision of a new and improved pair of independent interphase inductances for a double wye connected electric arc welding power source wherein the mmf's of the inductances flow in a common leg so as to be additive and the output current of the power source flows through a winding providing mmf's additive or subtractive to those of the inductances whereby the inductance and/or mutual coupling of the independent inductances can be made variable with the output current of the power source.

Another object of the invention is the provision of a new and improved fault protecting circuit for SCR's which provides an overload current-time curve closely approximating the overload current-time rating curves for the SCR's.

Another object of the invention is a new and improved fault protecting circuit for SCR's in an arc welding power source which enables the use of smaller SCR's for a given maximum output current rating of the power source.

Still another object of the invention is the provision of a new and improved firing circuit for the pilot SCR's of a main SCR firing circuit wherein the firing signal to the pilot SCR from a pulse transformer is fed to the gate through a capacitor whereby voltages are not induced by gate currents backwards through the pulse transformer to bias the unijunction transistor and prevent full discharge of its timing capacitor.

A further object of the invention is a control circuit for SCR's in a three phase welder which has a response time less than 10 cycles at 60 Hz.

Another object of the invention is a control circuit for the SCR's in a D.C. welder including a plurality of opamps each having a resistive and a capacitive feedback circuit whereby rapid time varying voltage changes in the feedback signal are dynamically filtered out.

Another object is the provision of a new and improved control circuit for the SCR's in an arc welding power source which does not have problems of hunting or instability.

Another object of the invention is the provision of a new and improved control circuit for the SCR's of an arc welding power source wherein the maximum and minimum phaseback angles are predetermined in a simple and effective manner.

Still another object is the provision of a new and improved control circuit for the power SCR's of an arc welder power source which provides a variable voltage, constant current output with the current increasing when the arc voltage decreases to a value below an arc sustainable voltage.

Another object of the invention is the provision of a new and improved control for the power SCR's of an arc welder power source having a low internal inductance which is able to phase back the SCR's sufficiently rapidly on a short circuit as to prevent blast off of the electrode when touching the work.

Another object is the provision of a new and improved control circuit of the type described which gives variable voltage, constant current output where the feedback signal consists of two separate voltages, one proportional to the arc current and the other to the arc voltage so as to give line voltage compensation.

The invention may take physical form in certain parts and arrangements of parts and in certain electrical circuitry, preferred embodiments of which will be described in detail in the following specification and illustrated in the accompanying drawings which form a part hereof and wherein:

FIGS. 2 through 5 are schematic diagrams showing the possible core and winding configurations for the independent interphase inductances.

FIG. 6 is a view somewhat similar to FIG. 5 but showing as an alternative embodiment an additional winding in series with the output of the power source.

IN GENERAL

Figure 1:
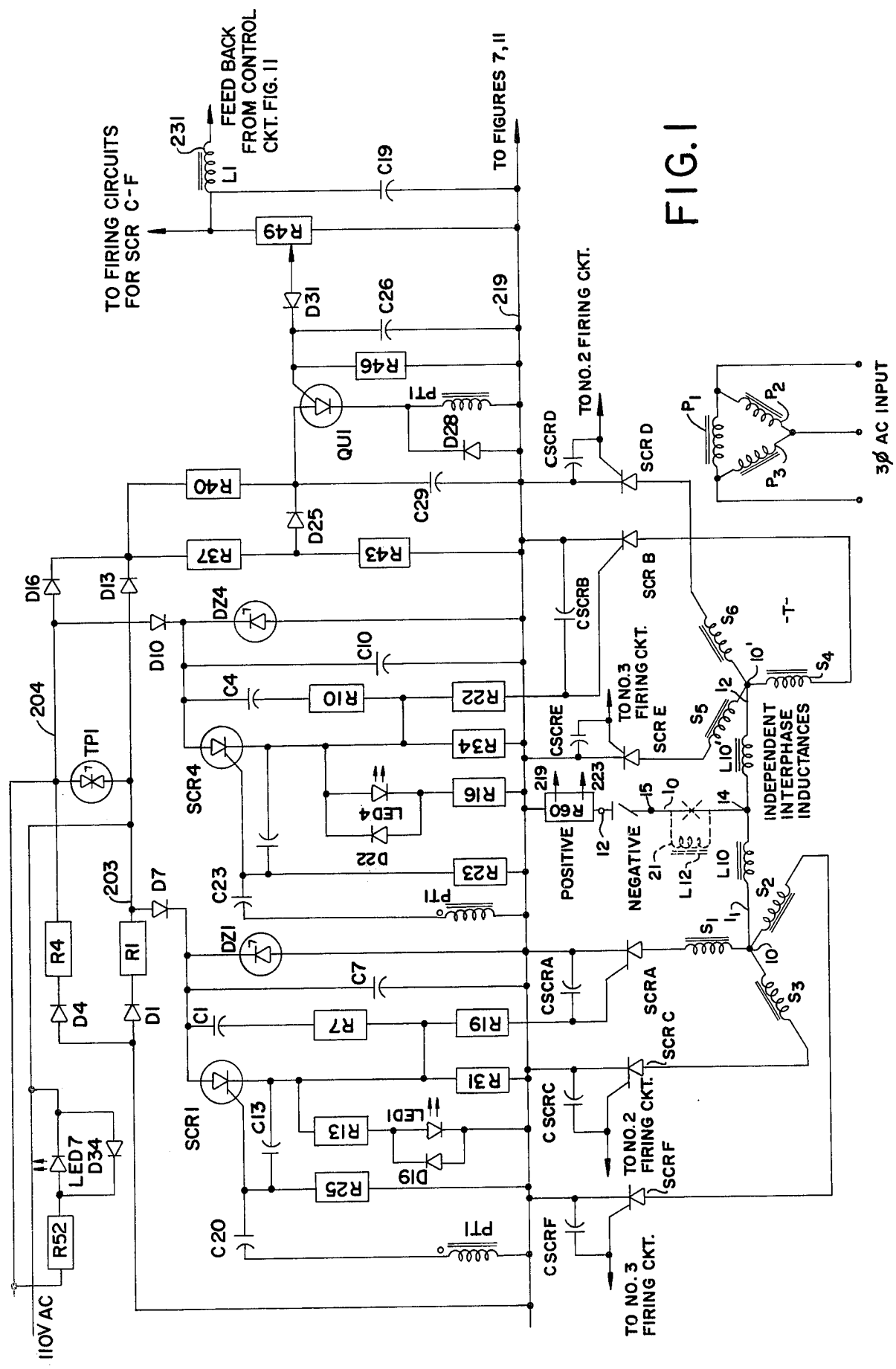
FIG. 1 is a wiring diagram of the main power circuit of a double wye connected SCR rectifier type arc welding power source together with one of the three firing circuits required for the SCR's.

Referring now to the drawings wherein the showings are for the purposes of illustrating a preferred embodiment of the invention only and not for the purposes of limiting same, FIG. 1 shows an arc welding power source comprised of a three phase transformer T having three delta connected primary windings P 1-3, and six secondary windings, S1-6, with one set of windings S1-3 and the other set of windings S4-6 wye connected to have inner terminals interconnected to form neutral points 10, 10' respectively and outer terminals each connected to anodes of separate silicon controlled rectifiers, SCR A, B, C, D, E, F, the cathodes of which are all interconnected to form through shunt R-60 the positive output terminal 12 of the source. The neutral points 10, 10' supply power to the negative output terminal 15 of the power source. In accordance with the invention, a pair of independent inductances L 10, L 10' are connected one in electrical series, with each set of windings and the output terminals, the mid-point 14 connecting to the negative output terminal 15 of the power source.

FIG. 1 shows all six of the main power SCR's but only the firing circuit for two, namely those associated with secondary windings S1 and S4 which supply a no load voltage 180° out of phase to their respective SCR's, SCR A, SCR B. The gates of these SCR's are energized by means of pilot SCR's, SCR1, SCR4 respectively which are moved to conductance by a programmable unijunction transistor QU1 which fires in response to an amplified and filtered feedback signal from the control circuit of FIG. 11.

This control circuit receives a signal from a shunt R60 in series with the positive output terminal 12 of the source and includes a pair of operational amplifiers X201a, X201b which feeds a signal to transistor Q203 which provides a signal to the firing circuit of FIG. 1. A switch SW6 enables changing the power source output from constant voltage to constant current. Potentiometer R1 enables adjustment to the desired output voltage or current. Transistor Q201 shifts the constant current output to increasing current when the source voltage goes below a predetermined value below an arc sustainable voltage.

Figure 8:
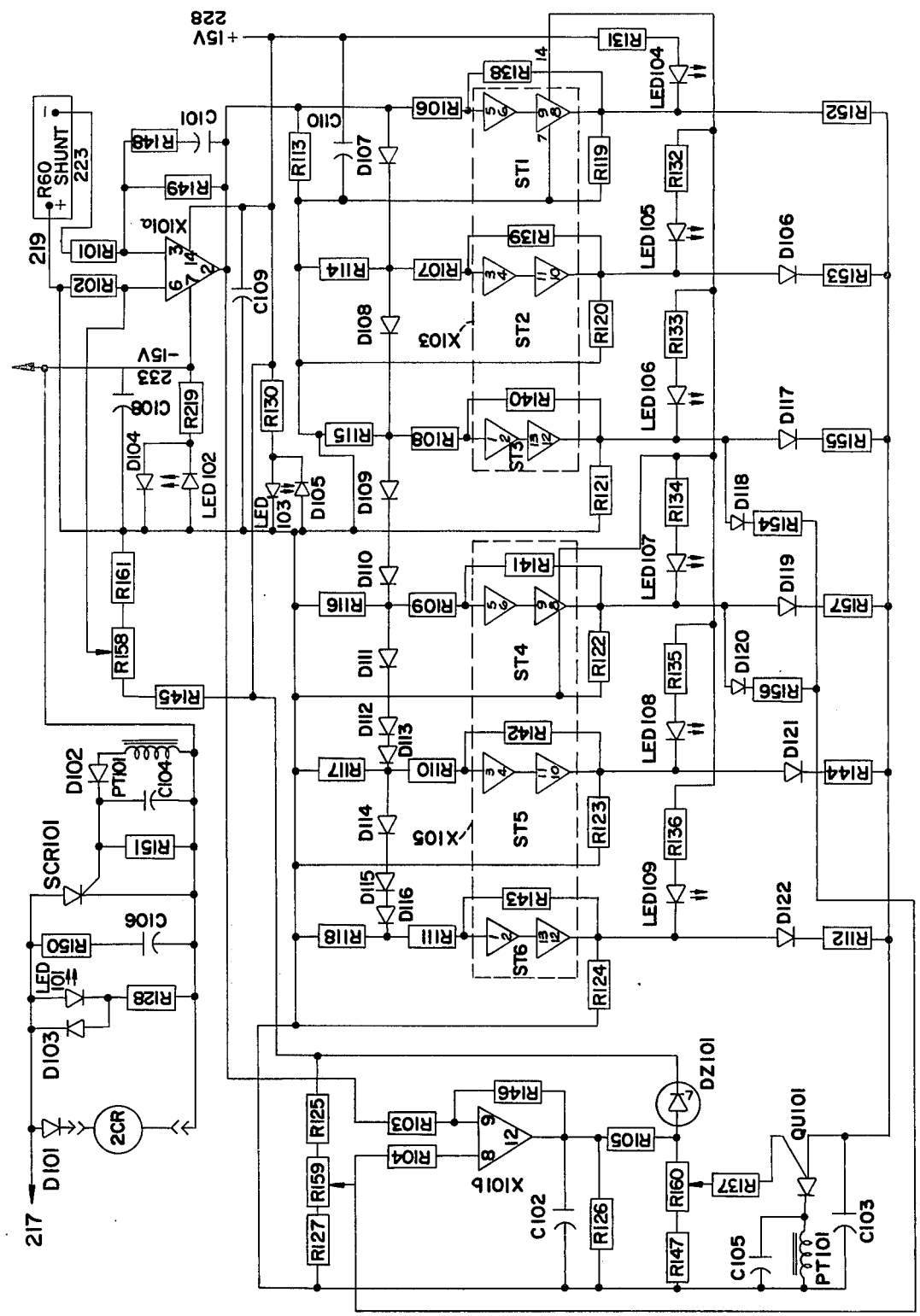
FIG. 8 is a schematic diagram of the fault protection circuit.

In addition the source includes a fault protecting circuit shown in FIG. 8 which receives an input signal from the shunt R60, amplifies it with an operational amplifier X101a feeds it to a plurality of schmitt triggers ST1-6, one programmed to switch on when the source output current exceeds the rated output current of the main SCR's and the others to progressively switch on in response to increasing amounts of overload. These schmitt triggers fire a PUT QU101 at progressively shorter times as a function of the amount of overload. Importantly a second operational amplifier X101b which is provided, progressively changes the switching on voltage of the PUT in proportion to the amount of overload so as to produce an overload time-current curve corresponding to the overload time-current rating curve of the main SCR's.

TRANSFORMER AND SCR'S

The transformer T is relatively conventional in construction and need not be described further herein. Each secondary winding of each wye has one phase of the A.C. power with pairs of windings S1, S4; S3, S6 and S5, S2 having no load output voltages 180° out of phase. Pairs of SCR's, SCR A, SCR B; SCR C, SCR D; and SCR E, SCR F are respectively associated with these pairs of windings. Each pair of SCR's is fired by a common firing circuit as will be hereinafter detailed. Only one firing circuit is shown in FIG. 1. The other two are identical.

The transformer T preferably is so constructed as to have a minimum leakage reactance so as to add a minimum of inductance to the welding circuit. The output voltage is thus essentially constant with varying current. The only inductance in the source is that supplied by the inductances L 10, L 10' and only the ripple frequency is present in such inductances.

INDEPENDENT INDUCTANCES

An an important part of the present invention, each set of secondary windings has an electrical series therewith identical independent inductance L10, L10' as distinguished from an interphase transformer, that is to say the mmf's of the two inductances are so arranged that they never oppose each other as in an interphase transformer as heretofore. Thus as is shown in FIG. 2 the inductances L10, L10' each comprise a pair of windings 16, 16' each on separate core-type iron laminations 17, 17', either with or without an air gap. In the embodiment shown the inductances L 10, L 10' each connect from neutral point 10, 10' respectively to mid point 14.

Alternatively as shown in FIG. 3 the laminations may be of the shell type having a pair of side legs 18, 18' and a center leg 20 of generally twice the cross-sectional area of each side leg. The windings 16, 16' of the inductances are then on the center legs 20 and 20' respectively.

Alternatively as shown in FIG. 4, the laminations may be of the shell-type having a pair of side legs 18, 18' and a center leg 20 of generally twice the cross-sectional area of the side legs with the windings 16, 16' on the side legs with the windings so polarized that the mmf's are subtractive in the center leg 20. Alternatively as is shown in FIG. 5 the windings 16, 16' may be so polarized that the mmf's are additive in the center leg 20. Because the cross sectional area of the leg 20 is twice that of the side legs 18, 18', there is no, or substantially no mutual coupling between the windings 16, 16'.

In the latter situation, it is possible to use an inductance L-12 in series with the mid point 14 and the output terminal 15 which winding is comprised of winding 21 on the center leg 20, of the lamination of FIG. 6 and with its mmf being either additive or subtracting to the mmf's of the side leg windings 16, 16', that is to say of the independent inductances. In the event that this winding 21 is used, the center leg of the laminations must have an air gap to prevent saturation thereof. Current in this winding 21 results in some interphase transformer action in addition to independent inductance. This winding 21 or inductance L-12 is shown in dotted lines in FIG. 1 as it is not always used.

In the lamination configurations of FIGS. 2-5, an air gap(s) (not shown) may be provided as necessary or desired.

The shell-type core and winding configurations of FIGS. 4 and 5 are preferred. In lower current rated machines, air gaps need not be provided. In higher current rated machines, an air gap is preferably provided in each side leg and the center leg. In such latter case, this results in a slight degree of interphase transformer action in addition to the independent inductance action.

A typical shell-type core for a power source for 1500 ampere maximum output has side legs 18, 18', 1.06 × 9.75 in cross section and a 0.030 air gap, a center leg 20, 2.12 × 9.75 and a 0.092 air gap. Each winding 16, 16' has six turns.

In operation, the independent inductances have no effect at zero output and the respective pairs of SCR's are forward biased 180° out of phase. Once output current $I_0$ flows, the inductors L10, L10' are excited by currents $I_1$ and $I_2$ flowing therein and the self inductance of the inductors results in a relative phase shift of the currents $I_1$, $I_2$ to approximately 60° out of phase at 0° or 90° phaseback of the main SCR's. This may be distinguished from an interphase transformer where the currents in each winding of the interphase transformer are substantially in phase at the same phaseback angles of the SCR's. The amount of ripple in the combined output current Io using the independent inductances is thus substantially less than with the interphase transformer. Using the invention there is no need to use additional inductance in series with the midpoint 14 and the output terminal 15. The inductance of the inductors L 10, L 10' satisfies the arc requirements.

FIRING CIRCUIT

One of three identical phases of the firing circuit for the power SCR's is shown in FIG. 1. In the total firing circuit of all three phases, only one R.F. choke, L1, and one R.F. filtering capacitor, C19, are needed for the entire circuit. The output of L1 feeds to the other two firing circuits (not shown). The capacitors CSCR A-F appearing directly across the gates of the main power SCR's, SCR A-F are mounted as close to the power SCR's as possible for R.F. interference protection.

The power supply for each firing circuit is a 110 volt auxilliary transformer (not shown) which is identically phased to the anode voltage on the main power SCR's SCR A, SCR B it will control. This A.C. voltage is full wave rectified by diodes D1, D4, D13, and D16 and energizes the anode of PUT QU1. This A.C. voltage is also half wave rectified by diodes D1, D4 and used to charge the power SCR gate pulse energy supplying capacitors C7 and C10 respectively. The half wave pulses are in phase with the anode voltage on the main SCR which it will be used to fire. The two ballast resistors, R4 and R1, limit the current to the zener clamping diodes DZ1 and DZ4 respectively. To minimize distortion of the voltage that appears on the timing circuit, the RC time constant of R4 and C7 is kept to a minimum. This insures that the proper voltage level versus time is reached early enough for maximum conduction of the power SCR's.

The timing of the gate pulse, the point in time of forward bias the power SCR will receive gate energy to turn on, is determined by the timing circuit and in particular by the voltage levels on the anode and gate of a programmable unijunction transistor (PUT), QU1. Once the voltage at the anode exceeds the voltage at the gate, the PUT will trigger. The voltage at the gate is controlled by the feedback from the control circuit of FIG. 11 fed through L1, the position of the tap on trimmer R49, and diode D31. Capacitor C19 and C26 filter out only RF. The voltage at the anode of QU1 is controlled by a combination of resistors, diode and capacitor that will insure proper energy to turn the PUT on at maximum conduction angle of the power SCR's or very early in time when the power SCR's are forward biased. To supply sufficient energy to turn the PUT on early in the voltage applied cycle, a combination ramp and pedestal function is provided. The voltage from diodes D1, D4, D13, D16 across a combination of R37 and R43 is clamped at the voltage of DZ1 on one half cycle and DZ4 on the other half cycle. The combination of R43, R37, and D25 sets up a controlled maximum, low resistance, charging path for capacitor C29. This will yield a pedestal voltage on capacitor C29 which is equal to $$\frac{R43}{R37 + R43} \times V_{DZ4} - V_{D25}.$$

Figure 13:
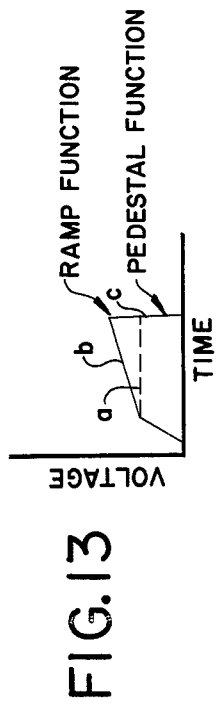
FIG. 13 is a graph showing the voltage time relationship on the anode of QU 1.

Diode D25 blocks C29 from discharging back through R43. R40 which is in series with C29 is a high resistance charging path and introduces a ramp function on capacitor C29. The resultant voltage on C29 is shown in FIG. 13, line 'a' being the clamped voltage between R43 and R37 and line 'b' being the slower increasing voltage due to R40. Line 'c' is the voltage when QU1 fires. This voltage 'b' is such that there will be sufficient energy to trigger QU1 at zero phase-back or 100% conduction of the power SCR's.

Once the PUT triggers, it will discharge C29 through the primary winding of the pulse transformer PT1. In order to insure triggering at the same point, capacitor C29 has to discharge completely to have the same initial condition on it each time. To accomplish this, the gate signal to the pilot SCR's, SCR1 and SCR4, is capacitively coupled to the gates of these same SCR's. This eliminates any reverse biasing of the PUT due to currents in the pilot SCR gate. If a reverse bias is present on the PUT, capacitor C29 will not discharge completely and the timing will not be reproducible. This is an important feature of the invention.

Figure 12:
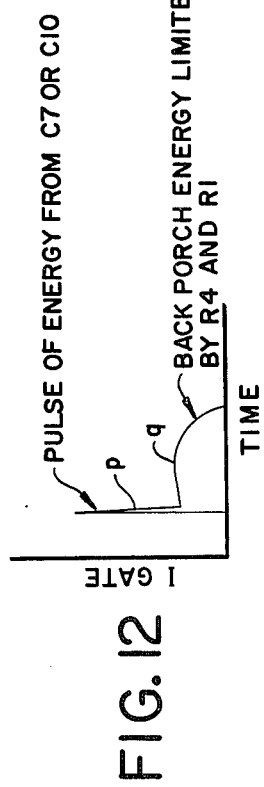
FIG. 12 is a graph showing the current vs. time characteristics of the firing signal to the gate of the main SCR's.

The firing circuit for the main power SCR's, SCR A, SCR B, has two identical circuits and is shown in FIG. 1. Only SCR A will be analyzed in detail. When lead 203 becomes more positive than lead 204, a current will flow through diode D7 charging capacitor C7 to a voltage that is clamped by the zener DZ1. The current through the diode D7 is limited by resistor R4. Capacitor C1 and resistor R7 form a snubber circuit around SCR1 which protect it from fast changes in voltage ($dv/dt$) for a change in time. Resistor R25 provides a shunt path for any leakage current, anode to gate. This keeps the SCR from self triggering due to high leakage current. Capacitor C13 protects the gate of SCR1 from false triggering due to R.F. signals. Resistor R19 is a current limiting resistor for the gate of the SCR A limiting the maximum peak current the main SCR's gate can have due to the discharge of capacitor C7. Once the PUT triggers, a voltage pulse is transmitted through the pulse transformer PT1 which is capacitively coupled through C20 to the gate of the pilot SCR, SCR1. Once the pilot SCR receives its gate pulse, it will turn on, thereby discharging capacitor C7 through R31 and the parallel combination of R19 and the gate of SCR A. A sharp pulse "*p*" of energy (see FIG. 12) is applied to the gate of SCR A.

Once SCR1 is turned on, it will stay on as long as it is forward biased, i.e. the remainder of the time period that line 203 is more positive than line 204. The voltage that is developed across R31 from the conduction of SCR1 will supply energy to gate the main power SCR A. As the half wave rectified pulse on 204 is in phase with the forward biasing voltage on SCR A, the gate will continue to receive energy as shown by "*g*" (FIG. 12) until SCR A fires. When the half wave pulse goes to zero, SCR1 goes off and stays off until the next pulse from QU1. This half wave pulse is referred to herein as "back porch" energy. This "back porch" energy is important to proper operation although not novel.

Due to the nature of a double wye with interphase inductances, the main power SCR's at first become forward biased later in time; that is, before the interphase inductances are excited. Once the interphase inductances become excited, the forward voltage on the power SCR's is earlier in time. To obtain maximum conduction of the power SCR's, it is necessary to have the gate pulse occur when the main SCR's are forward biased. Under extremely light loads, before the interphase is excited, the peak gate pulse energy from C7 is discharged before the power SCR A is forward biased. As a result, "back porch" energy from the 110 A.C. source is continued to be supplied through diode D7 and is applied to the gate of the main SCR A during its forward biasing time period. The main power SCR's will fire due to the "back porch" energy under light loads and will fire due to the pulse of energy under loads capable of fully exciting the interphase transformer. A typical current for exciting the interphase inductance is 10% of rated output current.

Light emitting diodes are used in the circuit to facilitate trouble shooting. When the LED's are lit, the circuits are functioning. LED7, with its current limiting resistor R52, shows that the A.C. voltage is present to energize the circuit. Diode D34 protects the LED from reverse voltages. The same is true of D19 and D22. LED1 and LED4 shows that energy is being delivered to the gates of the main SCR's. R13 and R16 are current limiting resistors for LED1 and LED4. TP-1 is a thyrector that protects the circuit from transients.

POWER SUPPLY

Figure 7:
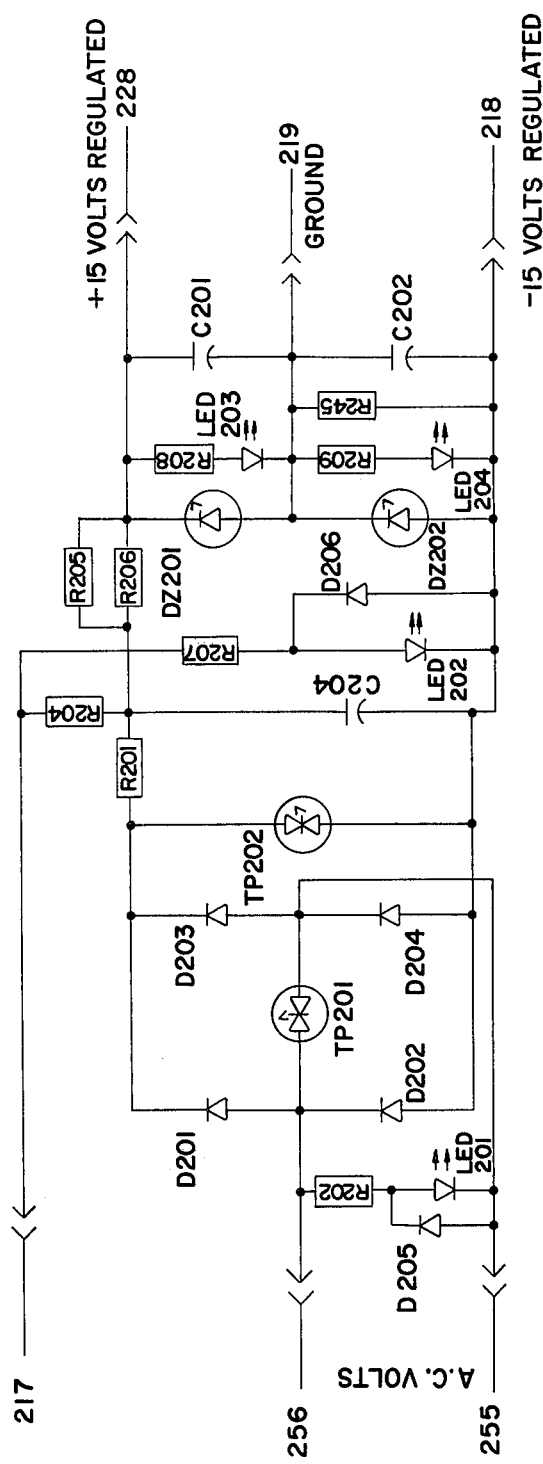
FIG. 7 is a schematic diagram of the power supply for the control and fault portions.

The power supply for the control and fault circuits is shown in FIG. 7. It is relatively conventional and is shown for the purpose of completeness. An A.C. voltage is fed into the full wave bridge rectifier composed of D201, D202, D203, and D204. Thyrectors TP201 and TP202 are transient suppression devices to protect the bridge rectifier and following circuitry. Capacitors C201 and C202 protect the operational amplifiers of the fault and control circuits from transients. Resistor R201 is currrent limiting resistor that limits the inrush current to the large filtering capacitor C204. R204 is a current limiting resistor in lead 217 which is connected through a diode in the fault protection board to the 2CR relay. The parallel combination of resistors R205 and R206 are ballast resistors that limit the current to the Zener diode regulated split supply of DZ201 and DZ202. Line 219 is referred to as ground and is connected common with the gates of the main SCR's. Zener diode DZ202 is the negative fifteen volt and Zener diode DZ201 is the positive 15 volt supply of the split power supply for the operational amplifiers. The light emitting diodes are used to visually inspect circuit operation. Light emitting diode, LED203, will light when the positive fifteen volt supply is operative and LED204 when the negative fifteen volt supply is operating. Resistors R208 and R209 limit the current through the LED's. LED202 will light up when the fault protection has not been activated. Resistor R207 limits the current through the LED and diode D206 protects it from reverse voltages. LED201 will light up and show the presence of A.C. power to the power supply. Resistor R202 limits the current in the LED and diode D205 protects the LED from reverse voltages. R245 limits the current through DZ202.

FAULT PROTECTION

The fault protection circuit, is shown in FIG. 8 and performs a single function; it removes the input power to the machine as a result of an overload. Because it is necessary to have the capability of withstanding short overloads, e.g. starting short circuit currents, the circuit allows for an overload to exist for a predetermined period of time. The higher the overload the quicker the input power must be interrupted. This is necessary to protect the main SCR's from excessive junction temperatures.

The circuit receives its operating power from the split power supply shown in FIG. 7 and receives its controlling input signal from the shunt R60. Since the circuit is only concerned with current overloads, the feedback need come only from the shunt voltage drop which is proportional to the current. This voltage feedback is amplified and when it exceeds a particular voltage, hex inverters connected as Schmitt triggers or level detectors will switch and start the process that will interrupt the input power to the main power transformer.

The elements of the circuits are as follows: Amplifier X101$a,b$ is a dual, linear, operational amplifier. The first half X101$a$ is connected directly to the shunt R60 and its output feeds the two hex inverters X105 and X103. Each inverter has three Schmitt triggers for a total of six switches, ST 1-6. The Schmitt triggers ST 1-6 all switch at a set voltage determined by its power supply and the respective resistor networks of: R138, R106; R139, R107; R140, R108; R141, R109; R142, R110; and, R143, R111. These will switch at various levels of feedback and yield different time constants for the different current level triggering points. All the switches have the same threshold, switching voltage, set by the resistor networks. The different levels of switching are accomplished by the forward voltage drops of diodes D107–D116. The different time constants are accomplished by progressively paralleling resistors R152, R153, R155, R157, R144 and R112, when the triggers switch. After the triggers switch, capacitor C103 charges up through such of the parallel resistors as are switched 'on' by the switches ST1-6 and triggers programmable unijunction (or PUT) QU101 which then triggers SCR101 which will cause relay 2CR to deenergize which will open the main contactor (not shown) and interrupt the input power to the machine.

Referring to FIG. 8, the sequence of events and component functions are as follows. As the current passes through the shunt R60, a voltage proportional to the current is developed. This voltage is fed into the first half of amplifier X101a. The amplifier is already prebiased by the divider network of R145, R158, and R161, which are tied to the positive fifteen volts of the power supply. This divider network provides a positive DC voltage to the non-inverting input of the amplifier and provides a positive D.C. output from the first half of X101a. The voltage from the shunt is added algebraically to this voltage and since it is a negative voltage applied to the inverting input, the amplifier is driven further positive. Once the welding current exceeds the overload condition, the output of the amplifier becomes sufficiently high to switch the first schmitt trigger ST 1 and put resistor R152 in series with capacitor C103. Capacitor C103 will then charge, in a fixed period of time, until its voltage exceeds the voltage already on the gate of the programmable unijunction QU101. At that point, QU101 will fire, generating a pulse in the pulse transformer PT101 which will trigger SCR101, and short out the relay 2CR causing the main contactor (not shown) to drop out, thereby interrupting the power to the main transformer. The SCR circuit contains a number of protective circuit elements which are as follows. Resistor R151 allows anode to gate leakage to shunt away from the gate and reduces noise susceptability. Capacitor C104 is for R.F. protection and diode D102 is to increase noise immunity. The combination of resistor R105 and capacitor C106 is a snubber circuit that protects the SCR from fast changes in voltage with respect to time or dv/dt. The light emitting diode LED101, when lit, indicates that 2CR is energized. Resistor R128 limits the current through the LED, and diode D103 protects LED101 from reverse voltages.

The capacitor C105 is used for R.F. protection. Resistor R137 is used for temperature compensation of the PUT QU101. Resistor R147 and trimmer R160 serve as a voltage divider network for the voltage gate of the PUT. The voltage across R160 and R147 is five volts if the zener diode DZ101 is in conduction and approximately fifteen volts when the amplifier X101b is at full output. R105 is a resistor that drops voltage when DZ101 is conducting and R126 is a loading resistor of the operational amp. Capacitor C102 filters the output of the amplifier and resistors R103 and R146 set the gain of the amplifier. The resistor network of R127, R159 and R125 form a voltage divider network that feeds a positive voltage into the non-inverting input of the amplifier. This yields a positive output voltage. The output of the first half of the amplifier. X101a, the amplified voltage that is a function of the load current, is fed into the inverting input of amplifier X101b. As a result, the voltage that appears across R126 is the amplified difference between the non-inverting and inverting input. This results in a decrease in output from the operational amplifier X101b for increases in output of the operational amplifier X101a.

Figure 10:
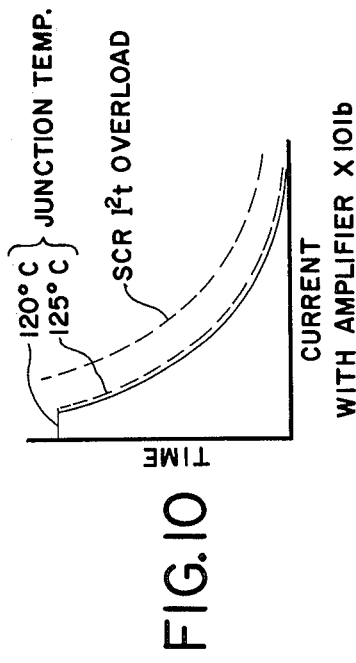
FIG. 10 is a graph showing the time-current characteristics of the fault circuit.

In addition to the reference voltage derived from the voltage divider of R127, R125, and R159, voltages from the third and fourth switch circuits ST3, ST4 are applied to the non-inverting input of X101b to obtain the trip out time versus current characteristic shown in FIG. 10. The voltages from the third and fourth switching circuits reset the operational amplifier to a different voltage level and drive the amplifier from the unsaturated to the saturated mode of operation. This changes the voltage on the gate of the PUT QU101 which changes the time it takes for the PUT to trigger.

The light emitting diodes LED104, through LED109 are lit when the switch circuits have not been energized. Resistors R131 through R136 are current limiting resistors for the LED's. Diodes D106, D117 through D122 serve as blocking diodes. The following resistors are the input resistors to switches ST 1 through 6 respectively: R106, R107, R108, R109, R110 and R111. When switch ST-1 switches, R106 is in series with C103 and fixes the RC time constant. When switch ST-2 switches, R153 is in parallel with R152 and their combination forms a new resistance value R' that charges C103 and forms another time constant RC. When switch ST-3 switches, R155 is in parallel with R152 and R153 and their combination forms a new resistance value R" which sets the charging time constant RC of capacitor C103. In addition to this, the voltage output of switch ST-3 is applied to R104 through D118 and R154. The same thing happens with D120 and R156 when switch ST-4 switches. The effects to the circuit of these two switches has been previously described. Since all the switches have identical values of switch point setting resistors, e.g. R106 through R111 and R138 through R143, the diodes D107 through D116 serve as trigger level selector by their forward voltage drops. The same voltage trips all six switches; however, a higher output from the operational amplifier X101a is required for each successive switch due to D107 through D116. Before switch ST-2 can switch, the output of the operational amplifier X101a has to be higher by the forward voltage drop of D107. ST-3 won't switch until the amplifier's output exceeds the switching voltage of the first switch by D107 and D108. The same logic is used to analyze the remaining switches; thus ST-4 has diodes D107 through D110, ST-5 diodes D107 through D113, and ST-6 has diodes D107 through D116. Resistors R113 through R118 are in the input of the switches and R119 through R124 at the output of the switches.

The light emitting diodes LED102 and LED103 are lit when the power supply is providing energy to the operational amplifier. Resistors R129 and R130 limit the current through the light emitting diodes. Capacitors C108, C109, and C110 protects the operational amplifier X101 and hex inverters from transients.

Figure 9:
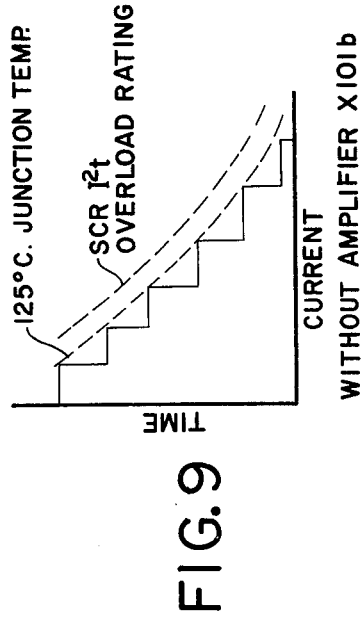
FIG. 9 is a graph showing the current-time characteristics of the fault circuit if the second opamp is omitted.

The programmable unijunction circuit is unique because the amplifier X101b changes the voltage level of the gate of QU101 as a function of load current and level of overload current. This permits the time of trip out to be a constantly varying function with changes in overload current. If it were not for this circuit, there would be a step function change in time with current. FIGS. 9 and 10 show examples of what the trip out time versus current would look like with and without amplifier X101b. Because of the smooth curve of FIG. 10, lower rated SCR's for a given maximum load can be employed.

The circuit of FIG. 8 is believed unique in that it not only gives a time trip versus overload current curve closely approximating that of the SCR's, but also filters out erratic changes in the output current which might cause unwarranted actuation of the overload controls.

CONTROL CIRCUIT

Figure 11:
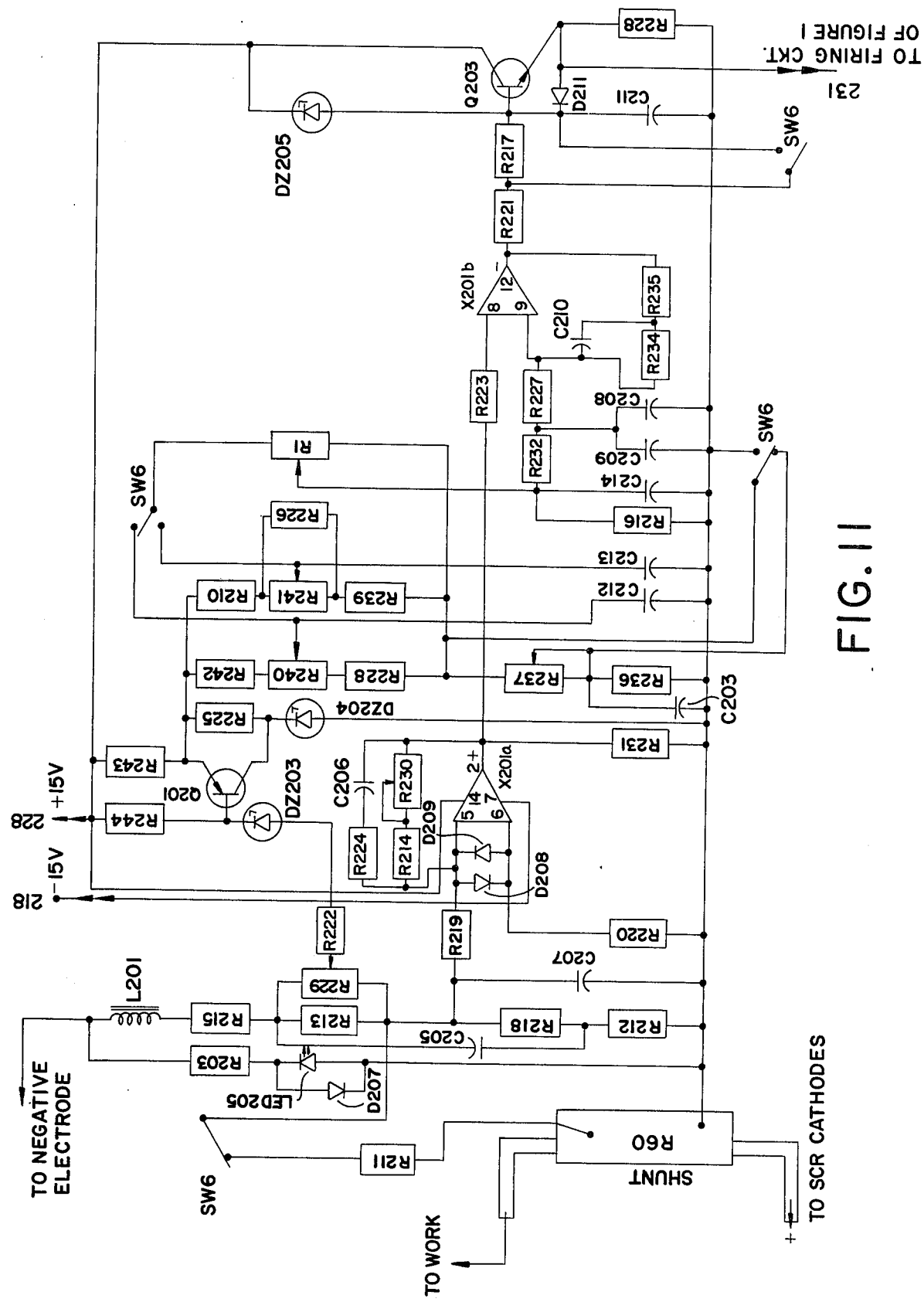
FIG. 11 is a schematic diagram of the control circuit for sensing the arc current and voltage and providing a conditioned feedback signal to the firing circuit of FIG. 1.

The control signal for the gate of QU1 of the firing circuits is provided by the control circuit shown in FIG. 11 which depending on the position of Switch SW 6 provides a control signal which will either hold the output voltage of the power source constant while allowing the current to be determined by the rate of feeding an electrode to the work; or vary the output voltage so as to maintain the current in the arc constant.

CONSTANT CURRENT OPERATION

SW6 in FIG. 11 is shown in the constant current position The source of the feedback signal comes from two sources. Current feedback is derived from the shunt R60 and is then processed to obtain variable voltage operation by reducing the conduction angle to hold the current constant with decreasing voltage. Resistor R211 provides a small percentage of voltage feedback to obtain line voltage variation compensation while under load.

R212 is in a network made up of R218, R229, R213, R215, C205, and L201. L201 is an RF choke that blocks RF voltage from being present in the circuit which originates at the output studs of the machine. R212 and R218 are in parallel with the shunt R60 and R211.

Resistor R212 is an unfiltered source of output voltage of the machine. This resistor introduces a signal to the inverting input 5 of the operational amplifier X201a which responds immediately to any rapid change in voltage due to arc striking. The signal is needed for system response when arc striking or starting. The signal from R212 starts to drive the dual operational amplifiers X201a, X201b to begin phasing back the power SCR's which limits the short circuit current of the machine during starting. The signal coming into the operational amplifier X201a is composed of current feedback from the shunt R60, a dynamic change due to R212 and a function of arc voltage due to R211. The voltage across R218 is filtered by capacitor C205. The time constant of C205 is governed by R215. The full significance of R218 is discussed later under constant voltage output.

The composite negative signal at the input 5 of the operational amplifier X201a is inverted, amplified and filtered. The linear operational amplifier X201a has a series of resistors and a capacitor in the feedback loop. Resistors R214 and R230 in conjunction with the input resistance of the operational amplifier set the D.C. gain or output for a given input. Resistor R224 and capacitor C206 serve to filter A.C. signals or time varying D.C. signals coming into the amplifier. This type of filtration, changing the D.C. gain with time varying signals, is essential for the circuit response necessary to obtain good welding. As the time varying signal increases in frequency, capacitor C206 becomes a short circuit thereby decreasing the D.C. gain of the amplifier and filtering out the time varying signal.

The output 2 of the first amplifier X201a, an amplified and filtered input signal, is a positive voltage developed across resistor R231. The voltage across R231 is an input voltage to the second amplifier X201b which algebraically adds a controlled variable reference voltage from R1 to the output of amplifier X201a. The resulting voltage is amplified and dynamically filtered by amplifier X201b. This output is further filtered by capacitor C211 through resistors R221 and R217. The amplifier's output is negative in the absence of a signal from amplifier X201a. The final output of the control circuit is obtained by transistor Q203. When the amplifier output is negative, the Zener diode DZ205 forward biases transistor Q203 and the resulting voltage is the difference between the Zener voltage of DZ201 of FIG. 7 and the Zener voltage of DZ205. This voltage is approximately 5 volts. This is the minimum output voltage of Q203. When the output of the control circuit is at a minimum, the output of the machine is at a maximum. When the output of the control circuit is at a maximum, the output of the machine is at a minimum. The difference between DZ201 and DZ205 sets the maximum conduction angle of the large SCR's and the value of DZ201 sets the minimum conduction angle of the large SCR's.

The resistors and capacitors around amplifier X201b, set the D.C. and time varying D.C. gain of the amplifier. Resistors R216, R232 and R227 along with capacitors C214 and C208 form a filtering network that supports the variable reference voltage when there is a change in the reference voltage due to switching from inch, to weld, to crater fill, etc. Resistors R234 and R235 along with the input resistance set the D.C. gain of the amplifier. C210 filters any time varying D.C. voltage by reducing the gain of the amplifier as C206 does for amplifier X201a.

Zener diode DZ204 is a very stable reference source of voltage. Rheostat R1 picks off a portion of that voltage as a reference voltage for amplifier X201b. Resistors R242, R240, R228, and R236 set the voltage limits that appear across R1. Capacitors C203 and C213 are for noise filtrations and R.F. In series with DZ204 is R225. This resistor serves to supply a tail out current effect for variable voltage operation. Referring to the circuitry of Q201, R244, DZ203, R222 and R229, it is apparent that once the output voltage of the power source drops below a predetermined value, the Zener voltage of DZ203, DZ203 will no longer conduct, turning Q201 off and removing the short circuit around R225. Once this has occurred, the voltage across R1 will increase calling for an increase in conduction angle of the main SCR's and a tail out current from the welder.

The overall constant current circuit works as follows:

The first amplifier X201a amplifies and filters a small voltage which is proportional to current, voltage and abrupt changes in voltage. This voltage is very low, on the order of hundreds of millivolts. The output of X201a is then algebraically added to a variable reference source. The variable reference source will increase at a fixed point of reduction in output voltage of the power source to allow an increase in current when the arc voltage becomes low. The output curve "f" is shown in FIG. 14 with the effects of line voltage compensation "g" and the "tail out" circuit voltage "h" which allows for the increase in current at a fixed point of reduction in output voltage.

Figure 14:
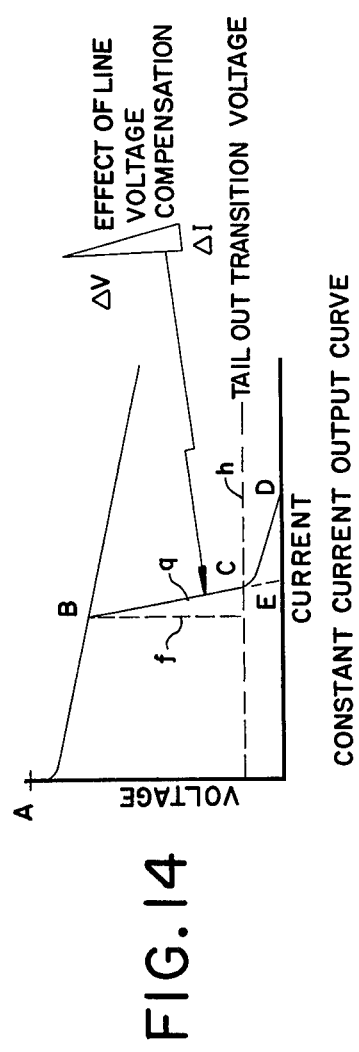
FIGS. 14 and 15 are volt-ampere output curves of the source on constant current and on constant voltage output settings respectively.

The resulting output curve, as shown in FIG. 14 yields excellent constant current welding with a low reactance transformer.

The constant current output curve is explained as follows: At point A there is no current being drawn from the machine so there is no signal from the shunt. As a result, there is no output from amplifier X201a and the variable reference source (DZ204, R1) is driving amplifier X201b negative. Zener diode DZ205 is therefore conducting, forward biasing Q203 whose output voltage is approximately 5 volts. At this level of feedback voltage, the main SCR's in the output of the machine are at maximum conduction angle and the machine is at full open circuit voltage.

Once a load is applied to the machine, current begins to flow through the shunt R60 applying a signal to amplifier X201a. Once the current becomes high enough, the output from X201a will exceed the reference voltage applied to X201b and the output of X201b will become positive, turning off DZ205 and increasing the output of transistor Q203. Once the output of the control circuit, Q203, increases above the 5 volts, the main SCR's start to phase back, reducing the output of the machine as shown at point B of the curve. The rate at which the output reduces as a function of current is determined by the combined gains of the two operational amplifiers X201a and X201b. It is also determined by the reduction in arc voltage since the circuit also senses the voltage.

As a result, the output of the machine, when in the constant current mode of operation, is the curve from points B to C on the curve. The change in current for the change in voltage is due to sensing the output voltage for line voltage compensation. At point C, the output curve would normally continue on to point E in the absence of the tail out circuit. Once the tail out transition voltage is reached, the reference voltage will increase which will cause the short circuit current to increase to the higher value at point D. This is needed for good starting and welding procedures. A continuously adjustable set of curves like the one shown in FIG. 14 are available between 200 to 1600 amperes for the 1500 ampere rated machine.

CONSTANT VOLTAGE

When SW 6 is switched to the other position, a constant voltage mode of operation results. The principal difference is that the feedback from shunt R60 is out of the circuit. A new trimming circuit is provided for R1 and resistor R217 is out of the circuit and capacitor C209 is added in parallel with C208 to filter abrupt changes in the reference voltage due to switching as in constant current mode of operation.

Figure 15:
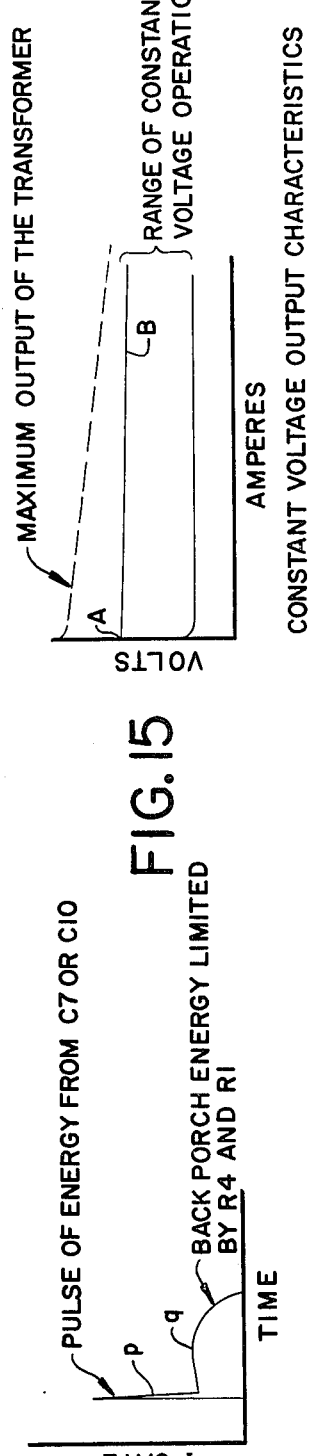

The input signal to amplifier X201a is now solely a function of the machine or arc voltage. The output voltage is divided by R212, R218, and R213 in parallel with R229 and in series with R215. This voltage is filtered by C205. As a result of sensing the output voltage, amplifier X201a has output at all times. Therefore, the output of X201b is always positive and the main SCR's are phased back because the output of Q203 is above 5 volts. The output characteristics are shown in FIG. 15.

As shown, there is a slight droop or reduction in voltage from A to B as the current increases. This is necessary to obtain good welding characteristics. Because the output voltage of the machine is being sensed and compared to a fixed voltage, line voltage variations will be compensated for.

The control circuit is believed to be unique in that it has an extremely fast reaction time, that is on overload it is able to phase the SCR's back in less that 10 cycles of the 60 Hz power while at the same time filtering out any rapid or high frequency voltage changes which might cause false phase backs.

SUMMARY

Thus it will be seen that a three phase double wye connected SCR rectifier arc welding power source has been described which accomplishes all the objects of the invention, and others; enables greater phase back of the SCR's than heretofore without the problems of notching; does not require a choke in the output circuit; has a fast acting control circuit not responding to erratic changes at the arc; has an overload current-time trip out curve which closely corresponds with the overload current-time rating curve of the SCR's; and has many other unique features.

Obviously modifications and alterations to the circuitry will occur to others upon a reading and understanding of this specification. It is our intention to include all such modifications and alterations insofar as they come within the scope of the appended claims.

Having thus described our invention, we now claim:

1. In an arc welding power source including: a three phase transformer having a pair of secondaries, each including three windings; a rectifier in series with each winding; the series rectifiers and windings of each secondary being connected in a wye configuration and arranged to have a pair of DC output terminals, said output terminals being connected in parallel and arranged to supply power to external terminals of said power source, the improvement which comprises: independent inductances in series with each secondary and its output terminals, in combination with, said rectifiers having a gate responsive to an input signal to cause the rectifiers to conduct for selected portions of the AC cycle.

2. The improvement of claim 1 wherein said inductances in series interconnect the neutral points of the wye-connection, the common connection of said inductances supplying power to one of the external terminals of said power source.

3. The improvement of claim 1 wherein said inductors comprise windings on separate magnetically permeable cores.

4. The improvement of claim 3 wherein said cores are each of a generally closed magnetic loop.

5. The improvement of claim 3 wherein said cores are each of the shell-type having three parallel legs and one of the windings is on each center leg.

6. The improvement of claim 1 wherein said inductors are comprises of a shell-type core having two side legs of one cross sectional area and a center leg of generally twice the cross sectional area of said side legs, the windings of said inductors being on said side legs and polarized so that the mmf's resulting from currents in the two windings are additive in the center leg.

7. The improvement of claim 6 wherein said center leg has an air gap and a third winding is disposed thereon, said third winding being in electrical series with an output terminal of said source, the mmf of said third winding being additive to the mmf's of said side leg windings.

8. The improvement of claim 1 including a third inductance in series with one of said output terminals.

9. The improvement of claim 8 wherein the mmf of said third inductance is additive to the mmf of the independent inductors.

10. The improvement of claim 1 wherein the independent inductors are the only inductances in said power source.

11. The improvement of claim 1 wherein said inductors are comprises of a shell-type core having two side legs of one cross sectional area and a center leg of generally twice the cross sectional area of said side legs, the windings of said inductors being on said side legs and polarized so that the mmf's resulting from currents in the two windings are subtractive in the center leg.

12. The improvement of claim 6 wherein each leg is provided with an air gap.

13. The improvement of claim 12 wherein the air gap in the center leg is greater than that on the side legs.

14. The improvement of claim 6 wherein said center leg has an air gap and a third winding is disposed thereon, said third winding being in series with an output terminal of said source, the mmf of said third winding being subtractive to the mmf of said side leg windings.

15. The improvement of claim 10 including a control circuit for supplying an input signal to said gate, said control circuit having an input proportional to the output of said source and said curcuit having a response time less than 10 cycles of 60 Hz A.C. power.

16. The improvement of claim 1 including a fault protecting circuit for de-energizing said power source due to an overload, said circuit having an input signal proportional to the output current of said source, and a trip time which decreases proportionally with the square of the current above the rated overload current of the rectifier means.

17. An SCR firing control circuit including a main SCR in an A.C. circuit and having a gate which when energized moves said SCR when forward biased to conduction, a pilot SCR having a gate and effective when fired to energize said main SCR gate, a pulse transformer for energizing said pilot SCR gate, said pulse transformer having a secondary between said pilot SCR gate and a neutral point, said pulse transformer also having a primary means for energizing said primary with a pulse including a first capacitor and a transistor which when 'on' discharges said capacitor through said primary, the improvement which comprises, a second capacitor in series between said secondary and said pilot SCR gate and a diode in parallel with said primary whereby the gate current of said pilot SCR does not flow in said secondary whereby to bias said transistor through said pulse transformer and prevent full discharge of said capacitor.

18. In a fault protection circuit for the main SCR's in a transformer SCR electric arc welding type power source, the SCR's having a known time vs temperature and I²t overload curve, said fault protection circuit having a response curve generally parallel to said I²t overload curve comprising:
   a. first gain means providing a first signal proportional to said weld current,
   b. a plurality of first switching means which go 'on' in sequence as said first signal progressively increases above a predetermined level,
   c. second switching means for de-energizing the input voltage to said power source including a first input which turns said second switching means 'on' when energized to a predetermined voltage level and a second input which changes said predetermined voltage level,
   d. said first switching means energizing said first input of said second switching means at progressively faster rates as said first switching means progressively go 'on',
   e. second gain means producing a second signal inversely proportional to said first signal on said second switching means second input, some of said first switching means when 'on' providing a signal on said second gain means to vary the gain of said second gain means.

19. The improvement of claim 18 wherein said second switching means includes:
   a. a PUT having a gate, an anode, and a cathode,
   b. means supplying said gate with a voltage normally above said anode voltage,
   c. a capacitor from said anode to said cathode
   d. a control relay,
   e. A normally off SCR in parallel with the operating coil of said relay and when 'on' de-energizing said coil,
   f. means when said PUT is 'on' for firing said SCR
   g. a plurality of triggers each normally 'off' and each arranged when 'on' to charge said capacitor through a resistance at a predetermined rate, said triggers being arranged to go 'on' sequentially as the output voltage of said first gain means increases whereby the rate of charge of said capacitor increases with the number of triggers which are 'on' whereby said capacitor is charged at more rapid rates as the current output increases above a predetermined value and the time for actuation of said second switching means decreases with increases of current above a predetermined amount.

20. In an arc welding power source fault protecting circuit,
   a. means producing a signal proportional to the source output current,
   b. a first opamp having a first and second input, means supplying an adjustable reference voltage to said second input, means supplying said signal to said first input,
   c. a PUT having a gate and an anode and a cathode, means supplying said gate with a voltage normally above said anode voltage, a capacitor from said anode to said cathode, said capacitor when charged to said gate voltage moving said PUT to 'on'
   d. a normally 'off' SCR which when 'on' deenergizes said power source
   e. means when said PUT is 'on' arranged to turn said SCR 'on,'
   f. a plurality of triggers each normally 'off' and energized from the output of said first opamp, each of said triggers arranged to charge said capacitor at a predetermined rate, said triggers being arranged to go 'on' sequentially as the output voltage of said first opamp increases with the number of the triggers which are 'on' whereby to decrease the time for said PUT to go 'on',
   g. a second opamp having a first input from a reference voltage less than saturation and a second input from the output of said first opamp, the output of said second opamp lowering the gate voltage on said PUT whereby said PUT fires at a lower charging level of said capacitor,
   h. some of said triggers when 'on' raising the voltage of said second opamp first input above said reference voltage to saturate said second opamp.

21. In an A.C. transformer SCR type arc welding power source including:
   a. a plurality of SCR's which when forward biased and their gates energized, conduct to supply a source output voltage, said SCR's having a known time-current overload curve, b. means for de-energizing said source before said overload curve is exceeded, said means including:

c. means producing a voltage proportional to the power source output current.

d. an amplifier for said voltage, e. a plurality of switches, the first being arranged to go 'on' when the output voltage of said amplifier exceeds a predetermined amount proportional to the maximum steady state current of said SCR's and the remainder going 'on' sequentially with progressively higher output voltages, f. switch means which when 'on' de-energize said power source and having a pair of input terminals, the energization of the first of which determines the voltage level on the second terminal which will cause said switch means to go 'on,' g. said switches when on acting on energize said second input terminal to said level in decreasing amounts of time proportional to the number of switches being 'on,' h. a second amplifier for the first amplifier output voltage and arranged to energize said first input terminal to lower said level, whereby the current-time curve for actuation of said switch means is a smooth curve corresponding generally to the SCR time-current overload curve.

22. The improvement of claim 21 wherein said first mentioned amplifier is an opamp having a feedback circuit which is frequency sensitive to lower the gain of the amplifier to rapidly changing voltages on the input thereof.

23. The improvement of claim 21 wherein at least some of said switches after the first switch goes 'on,' energize said first input terminal to lower the voltage level at which said switch means goes 'on.'

24. The improvement of claim 21 wherein said first and second amplifiers are each opamps, each having a second input terminal and means supplying a reference voltage to said terminals.

25. The improvement of claim 21 wherein said first and second amplifiers are each opamps, each having a second input terminal and means supplying a reference voltage to said terminals, said some of said switches energizing said second input terminal of said second opamp whereby to override its said reference voltage and change the output voltage of said second opamp as the overload current increases whereby to lower the firing level on the first input terminal of said switch means.

26. In an A.C. transformer SCR type arc welding source including:

a. a plurality of SCR's which when forward biased and their gates energized conduct to supply a source output voltage, b. a firing circuit for the SCR's having a nominal input voltage at which said gates are energized at 0° phaseback, c. a control circuit for said firing circuit having an input voltage proportional to the current output of said source, d. said control circuit including a plurality of amplifiers for said input voltages, e. means limiting the amplifier output voltage when the current proportional voltage is zero to not more than said firing circuit nominal input voltage, f. a manually adjustable reference voltage for determining the desired output current of said source, g. said amplifiers comparing the current proportional voltage with said adjusted reference voltage and when the amplified current proportional voltage exceeds said reference voltage, increasing their output voltage to said firing circuit to phaseback said SCR's, h. the gain of said amplifiers being such as to vary the output voltage of the source by phasing back the SCR's to hold the output current constant, i. the improvement which comprises means comparing the source output voltage with a fixed reference voltage and when said output voltage drops to less than a predetermined value due to short circuits on said source, changing said manually adjusted reference voltage to decrease the phaseback of the SCR's and increase the current beyond that determined by the manually adjusted reference voltage.

27. The improvement of claim 26 wherein a portion of said source output voltage is simultaneously fed to said amplifiers whereby to obtain a small increase in the output current with drops in source output voltage to compensate for line voltage variations.

28. The improvement of claim 26 wherein a first zener diode limits the minimum voltage from said amplifiers to said firing circuit to said nominal voltage, and the difference between the voltage of said first zener diode and a second zener diode limits the maximum voltage to said firing circuit and thus the maximum phaseback of said SCR's.

29. The improvement of claim 26 wherein said amplifiers have a frequency sensitive feedback circuit to reduce the gain thereof to rapid voltage changes.

30. The improvement of claim 26 wherein said control and firing circuits have a response time less than 10 cycles of 60 Hz A.C. power.

31. In an A.C. transformer SCR type arc welding source including:

a. a plurality of SCR's which when forward biased and their gates energized conduct to supply a source output voltage, b. a firing circuit for the SCR's having a nominal input voltage at which said gates are energized at 0° phaseback, c. a control circuit for said firing circuit having an input voltage proportional to the current output of said source, d. said control circuit including a plurality of amplifiers for said input voltages, e. means limiting the amplifier output voltage when the current proportional voltage is zero to not more than said firing circuit nominal input voltage, f. a manually adjustable reference voltage for determining the desired output current of said source, g. said amplifiers comparing the current proportional voltage with said adjusted reference voltage and when the amplified current proportional voltage exceeds said references voltage, increasing their output voltage to said firing circuit to phaseback said SCR's, h. the gain of said amplifiers being such as to vary the output voltage of the source by phasing back the SCR's to hold the output current constant, i. the improvement which comprises means simultaneously feeding a portion of said source output voltage to said amplifiers whereby to obtain a small increase in the output current with drops in source output voltage to compensate for line voltage variations.

32. In an A.C. transformer SCR type arc welding source including:
   a. a plurality of SCR's which when forward biased and their gates energized conduct to supply a source output voltage,
   b. a firing circuit for the SCR's having a nominal input voltage at which said gates are energized at 0° phaseback,
   c. a control circuit for said firing circuit having an input voltage proportional to the output of said source,
   d. said control circuit including a plurality of amplifiers for said input voltages,
   e. means limiting the amplifier output voltage when the current proportional voltage is zero to not more than said firing circuit nominal input voltage,
   f. a manually adjustable reference voltage for determining the desired output of said source,
   g. said amplifiers comparing the proportional voltage with said adjusted reference voltage and when the amplified proportional voltage exceeds said reference voltage, increasing their output voltage to said firing circuit to phaseback said SCR's,
   h. the gain of said amplifiers being such as to vary the output of the source by phasing back the SCR's to hold the output constant,
   i. the improvement which comprises a first zener diode which limits the minimum voltage from said amplifiers to said firing circuit said nominal voltage, and the difference between the voltage of said first zener diode and a second zener diode limits the maximum voltage to said firing circuit and thus the maximum phaseback of said SCR's.

33. In an A.C. transformer SCR type arc welding source including:
   a. a plurality of SCR's which when forward biased and their gates energized conduct to supply a source output voltage,
   b. a firing circuit for the SCR's having a nominal input voltage at which said gates are energized at 0° phaseback,
   c. a control circuit for said firing circuit having an input voltage proportional to the output of said source,
   d. said control circuit including a plurality of amplifiers for said input voltages,
   e. means limiting the amplifier output voltage when the current proportional voltage is zero to not more than said firing circuit nominal input voltage.
   f. a manually adjustable reference voltage for determining the desired output of said source,
   g. said amplifiers comparing the proportional voltage with said adjusted reference voltage and when the amplified proportional voltage exceeds said reference voltage, increasing their output voltage to said firing circuit to phaseback said SCR's,
   h. the gain of said amplifiers being such as to vary the output of the source by phasing back the SCR's to hold the output constant,
   i. the improvement which comprises said amplifiers having frequency sensitive feedback circuits effective to reduce the gain thereof to rapid voltage changes.

34. The improvement of claim 33 wherein said control and firing circuits have a response time less than 10 cycles of 60 Hz A.C. power.

35. The improvement of claim 6 wherein said side legs have an air gap and said center leg has none.

* * * * *